United States Patent
Liu et al.

(10) Patent No.: US 9,557,719 B2
(45) Date of Patent: Jan. 31, 2017

(54) ACCESS CONTROL SYSTEM USING SMART PHONE

(71) Applicant: Honeywell International Inc., Morristown, NJ (US)

(72) Inventors: Huatao Liu, Shanghai (CN); Lexin Hu, Shanghai (CN); Wei Wang, Shanghai (CN); ChengJun Tang, Shanghai (CN); Petr Pomenka, Studenka (CZ); Anand Agarwal, Bangalore (IN); Petr Starzyk, Brno (CZ); Robert John Probin, Glasgow (GB); Steven D. Huseth, Plymouth, MN (US); Sajith Kumar Arimbra, Bangalore (IN)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 160 days.

(21) Appl. No.: 13/777,388

(22) Filed: Feb. 26, 2013

(65) Prior Publication Data

US 2014/0240087 A1 Aug. 28, 2014

(51) Int. Cl.
*G05B 1/01* (2006.01)
*G07C 9/00* (2006.01)

(52) U.S. Cl.
CPC ............ *G05B 1/01* (2013.01); *G07C 9/00103* (2013.01); *G07C 9/00174* (2013.01); *G07C 9/00039* (2013.01); *G07C 9/00309* (2013.01)

(58) Field of Classification Search
CPC ............ G07C 9/00174; G07C 9/00309; G07C 2009/00412; G06F 21/31; G06F 21/6218

(Continued)

(56) References Cited

U.S. PATENT DOCUMENTS

| 6,947,571 B1 * | 9/2005 | Rhoads ................. G06Q 30/02 382/100 |
| 2008/0218330 A1 * | 9/2008 | Biles et al. .................. 340/506 |

(Continued)

FOREIGN PATENT DOCUMENTS

| CN | 1988703 A | 6/2007 |
| CN | 101151642 A | 3/2008 |

(Continued)

OTHER PUBLICATIONS

First Office Action and Search Report from corresponding CN patent application 201410063628.6, dated Dec. 7, 2015.
English-language translation of First Office Action and Search Report from corresponding CN patent application 201410063628.6, dated Dec. 7, 2015.
English-language translation of abstract for CN patent publication 1988703 A, dated Jun. 27, 2007.
English-language translation of abstract for CN patent publication 101826227 A, dated Sep. 8, 2010.

(Continued)

*Primary Examiner* — Hongmin Fan
(74) *Attorney, Agent, or Firm* — Husch Blackwell LLP

(57) ABSTRACT

A door access control system associates a unique passive identifier with each one of a plurality of doors for which controlled access is desired. Each of the identifiers can be attached to a location adjacent to each respective door. A smart phone with a predetermined scanning application can scan or read a respective identifier of a door for which access is desired. A representation of the door identifier along with an identifier of the smart phone can be transmitted to an access control unit. A data base of the access control unit can be interrogated to determine if that smart phone identifier is authorized to open the designated door. If authorized, then an access command can be transmitted to a local access control module that can release a locking mechanism for the respective door.

19 Claims, 5 Drawing Sheets

- APP to scan the Barcode
- Token (identification of cell-phone and door) to Server
- Server make decision — access authority — inform Controller
- Controller output to Lock

(58) Field of Classification Search
USPC ... 340/5.54, 5.51, 5.2, 545.1, 545.2; 726/17, 726/2; 235/382
See application file for complete search history.

(56) References Cited

U.S. PATENT DOCUMENTS

2013/0214898 A1    8/2013  Pineau et al.
2013/0221094 A1*   8/2013  Smith et al. .................. 235/382

FOREIGN PATENT DOCUMENTS

| CN | 101364316 A | 2/2009 |
| CN | 101482987 A | 7/2009 |
| CN | 101826227 A | 9/2010 |
| CN | 202711348 U | 1/2013 |
| WO | WO 2008/088398 A2 | 7/2008 |

OTHER PUBLICATIONS

English language translation of abstract for CN patent publication CN 101151642 A, dated Mar. 26, 2008.
English language translation of abstract for CN patent publication CN 101364316 A, dated Feb. 11, 2009.
English language translation of abstract for CN patent publication CN 101482987 A, dated Jul. 15, 2009.
English language translation of abstract for CN patent publication CN 202711348 U, dated Jan. 30, 2013.
Second Office Action from corresponding CN patent application 201410063628.6, dated Jul. 6, 2016.
English language translation of Second Office Action from corresponding CN patent application 201410063628.6, dated Jul. 6, 2016.

* cited by examiner

ACCESS CONTROL SYSTEM USING SMART PHONE

FIELD

The application pertains to door access control systems and methods of providing more convenient access. More particularly, the application pertains to such systems and methods that enable individuals to unlock a door using a wireless device, such as a smart phone or a PDA.

BACKGROUND

Access control systems and methods restrict access to resources, areas and properties, allowing only privileged entities access. Generally, access control systems include an interconnected set of controllers managing the entrance and exit of people through secure areas with electronic key cards and enable key card administration without having to change locks. Controllers, readers, and cards are indispensable components in known access control systems. Magnetic, optical, and RFID technologies are used in connection with readers and key cards.

Known door access control systems, while permitting controlled access, do exhibit some drawbacks. These include costs for the door readers as well as associated control devices. For enterprise level systems, there can be large numbers of readers and installations and, as a result, are expensive. Usually the readers will be continuously active, drawing electrical energy so as to be able to immediately respond to an inserted or swiped key card. Additionally, at times, authorized individuals forget to take their key card with them to their office or work facility and cannot obtain access to their work areas. This can, of course, represent a major inconvenience.

FIG. 1 illustrates a known door access system. FIG. 1A illustrates a process carried out by the system of FIG. 1. In the system and process of FIGS. 1, 1A, a reader is associated with each door on the system. Each individual authorized for access needs to be assigned an access key to be inserted into or swiped past the respective reader. These requirements underlie the problems noted above.

DETAILED DESCRIPTION

Figure 1:
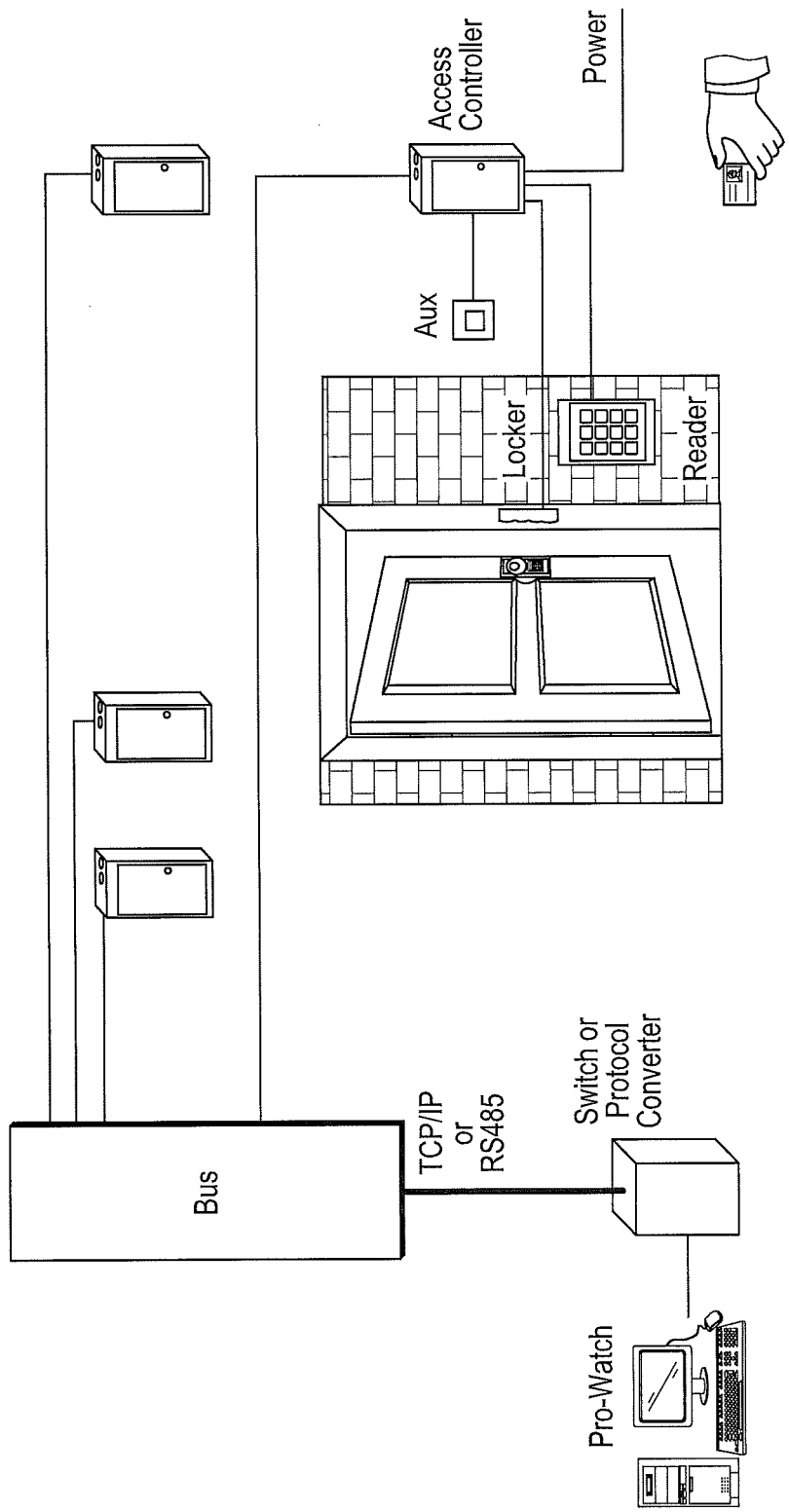
FIG. 1 illustrates a diagram of a prior art door access system.
Figure 1A:
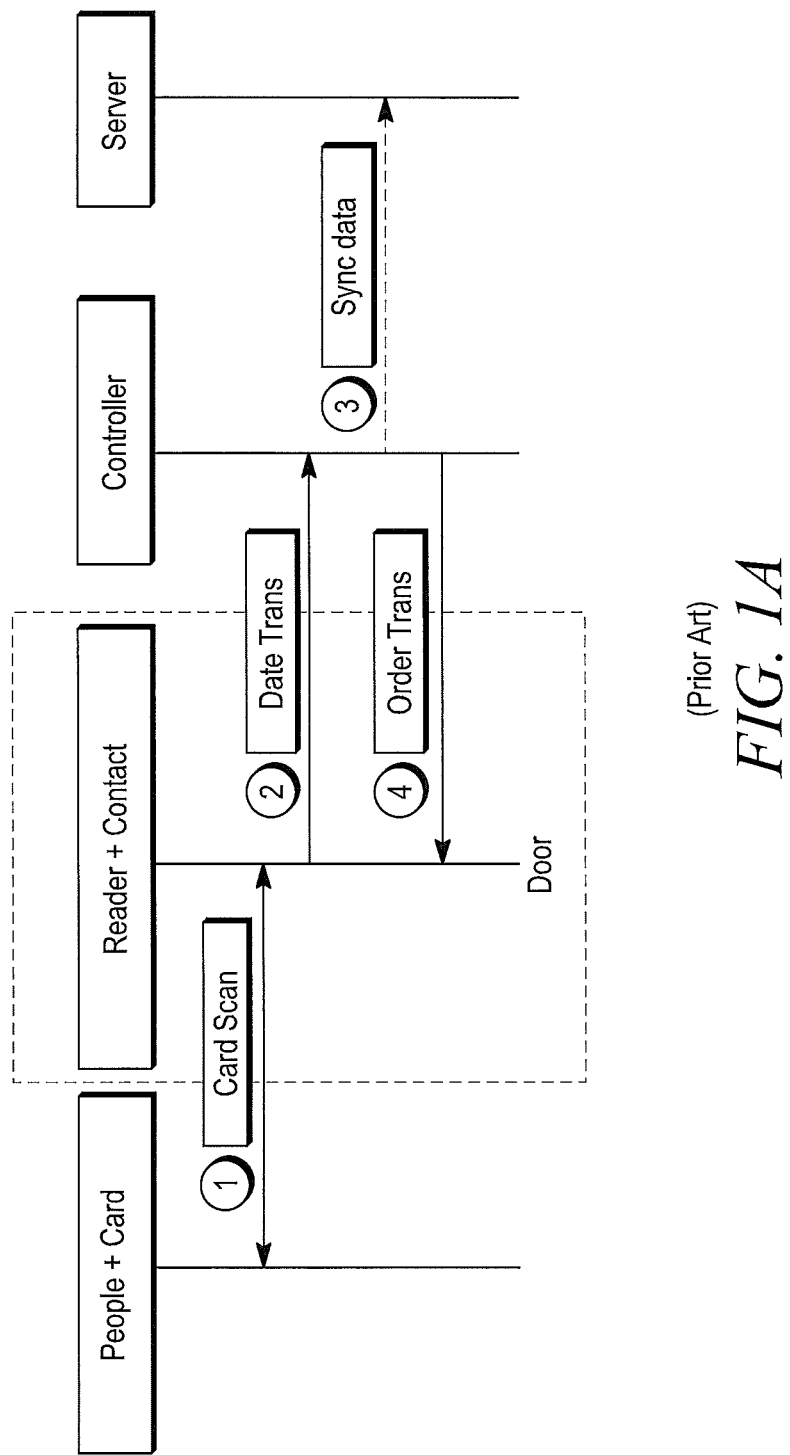
FIG. 1A illustrates an access control process carried out by systems as in FIG. 1.

While disclosed embodiments can take many different forms, specific embodiments thereof are shown in the drawings and will be described herein in detail with the understanding that the present disclosure is to be considered as an exemplification of the principles thereof as well as the best mode of practicing the same and is not intended to limit the application or claims to the specific embodiment illustrated.

In one aspect, embodiments hereof use wireless devices, such as smart phones or personal digital assistants (PDAs), to provide access to controlled areas. Lap top or tablet computers could also be used without limitation. Advantageously, the requirement to install a reader at each door is eliminated. This provides a direct initial cost reduction and also reduces operational costs.

In another aspect, the required authorization control circuits can be simplified, thereby providing a further cost reduction. Finally, users do not need a separate access card and only need to remember to bring their phone or PDA to work.

Embodiments hereof assign a unique code, such as a 2D barcode, to each door/door frame to incorporate a specific door into an access system. No separate reader/door is needed. Advantageously, a passive code carrying element can be associated with a respective door or frame. Other than as set forth herein, neither the details of the selected code nor the type of element with which the code is associated are limitations hereof.

An interface unit, which is less expensive than the cost of the controller boards used in known systems, functions as a bridge between a system host and door accessories, such as an exit button, door status monitoring, and a controllable locking/unlocking device for the door.

A wireless device such as a smart phone, PDA, or computer, will read the code associated with the door, via magnetics, optics, or near field RF, for example, and without limitation, and then transmit the door specifying code and device identifying information to the host. The host can then make a decision to allow access or not based on authorization provided by a mapping of the door code and wireless device information. If access is authorized, then host sends a wired or wireless command to the interface board that implements the door open function or action.

Figure 2:
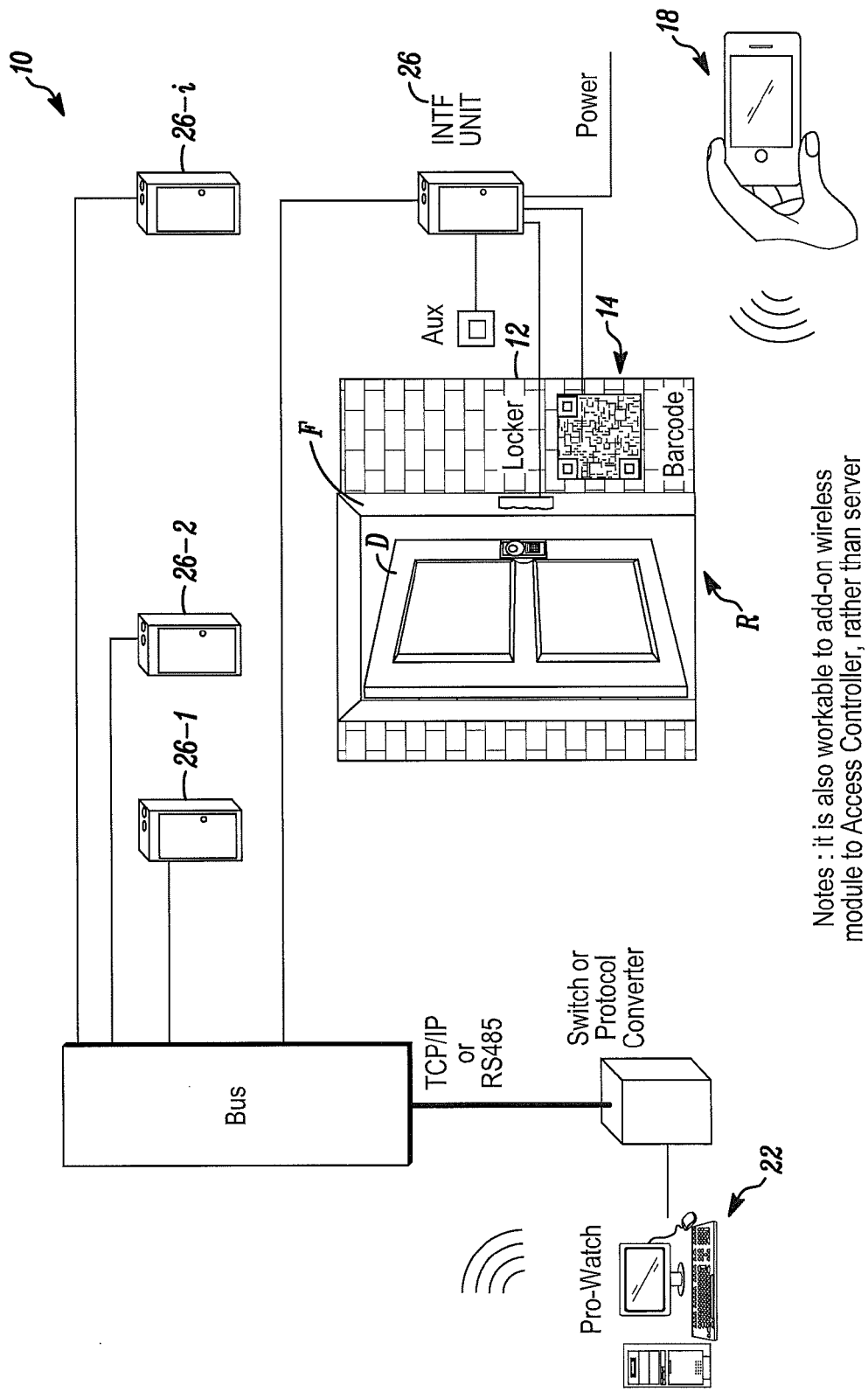
FIG. 2 illustrates a diagram of a door access system in accordance herewith.

FIG. 2 illustrates a system 10 in accordance herewith. The system 10 provides access to a region R that can be entered when the door D, pivotably mounted in a frame F, is released by a locker mechanism 12 mounted in the frame F. A coded element, for example, a 2D barcode 14, is associated with the door D.

The code 14 can be sensed or read using a wireless device 18, for example, with a downloaded barcode reading application. The device 18 can be implemented as a smart phone, PDA, tablet computer, lap top computer, or the like all without limitation.

The device 18 then transmits the barcoded information obtained from the door mounted code 14 to an Internet or wireless enabled host 22. The host 22, using the bar coded information as well as identification information from the device 18, makes an access determination.

If access is authorized, then the host 22 notifies the relevant interface unit, such as 26, in the vicinity of the door D. Those of skill will understand that the host 22 can be in wired or wireless communication with the unit 26 all without limitation. The host 22 can also be in communication with numerous other interface units, such as 26-1 . . . 26-i, which are associated with other doors. The units, such as 26-i, can each control access to a plurality of doors.

Unlike the prior art systems as in FIG. 1, the interface units 26 . . . 26-i do not incorporate any circuitry associated with the wireless unit 18 (comparable to the card sensing or reading control circuitry needed for each door in the prior art systems as in FIG. 1). As a result, the units, such as 26, can be less complex and less expensive than their prior art counterparts. This is an important advantage in connection with controlling access in enterprise-wide installations.

Additionally, the cost of the door mounted code, such as the code 14, is significantly less than the cost of having a reader associated with each door.

Figure 2A:
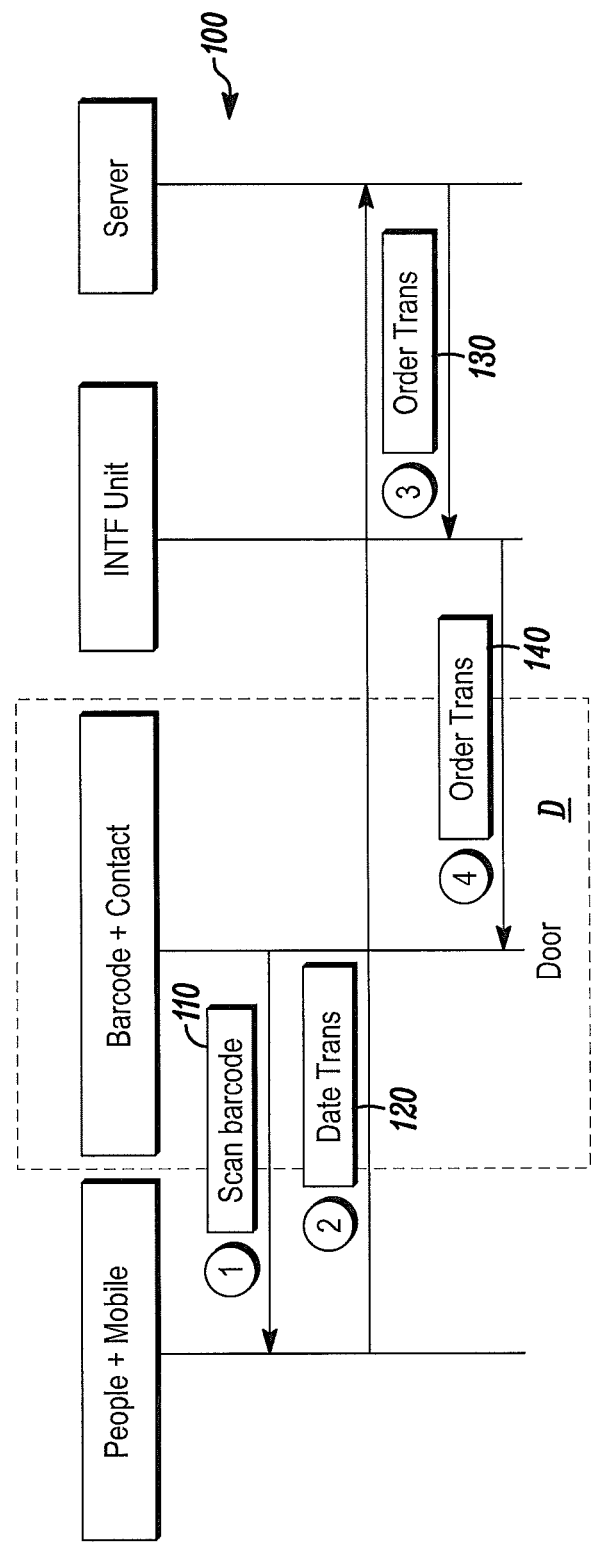
FIG. 2A illustrates an access control process carried out by a system as in FIG. 2.

FIG. 2A illustrates a process 100 carried out by the system 10. Initially, as at 110, a code is scanned. Data from the scan, which could also include information as to the scanning wireless device 18, is then transmitted to the host 22, as at 120. The host 22 carries out an access evaluation: if access is authorized, then the host 22 transmits an order or command, as at 130. The transmitted command is detected by an interface unit, such as the unit 26, which activates the door lock 12, thereby releasing the door D and providing access.

Figure 3:
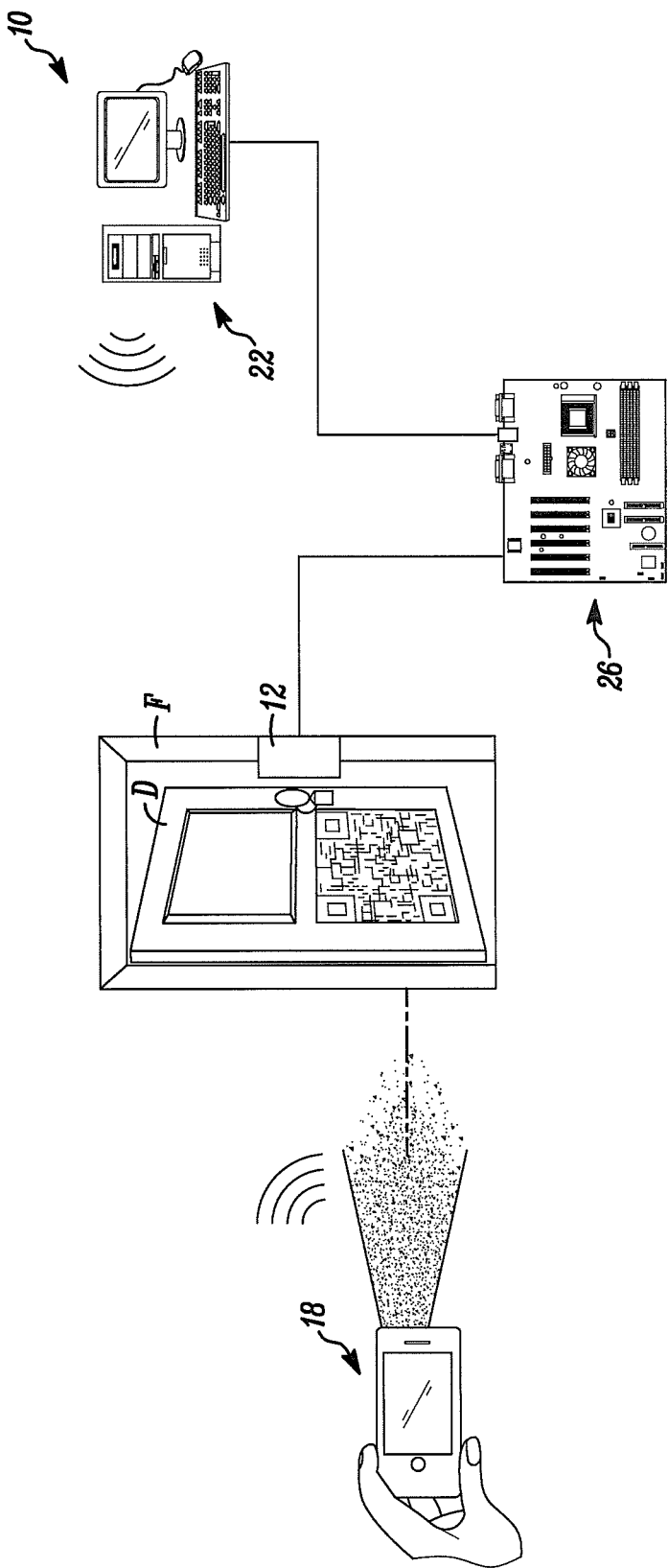
FIG. 3 illustrates additional aspects of the system of FIG. 2.

FIG. 3 illustrates, relative to the system 10, an embodiment in which the unit 26 is in wireless communication with the host or server 22. Both the host 22 and the interface the unit 26 can be Internet enabled with any one of the available wireless protocols all without limitation.

In the embodiment of FIG. 3, the wireless device 18, with a barcode scanning application, transmits a token identifying the door as well as the wireless device to the server or host 22. The host or server 22 makes an access determination and wirelessly notifies the unit 26 to provide access. The unit 26 then actuates or releases the door frame mountable locking element 12, thereby providing access into the region R via the door D.

As those of skill will understand, various alternate embodiments come within the spirit and scope hereof. For example, tickets or other authorizing documents can carry a printed code. That code can be read by a wireless device as noted above to obtain authorization feedback from a displaced data base. Finally, the access code might be required for all or only for specific doors.

Access or other forms of acceptance can be provided based on feedback from searching the data base. Near field communications can be used, without limitation, to sense or read information stored on an identifying indicium. Examples include, without limitation, a label or other form of code carrying element, for example, passive RFID chips, attached to or carried on the respective door, document, or product.

In a further aspect, the bar codes, one or two dimensional versions, could be printed with either visible or infra-red inks. It will also be understood that other printed material quite different from bar codes, such as pictures or other images, could be associated with the various doors and could be sensed and recognized by the access system.

In yet another embodiment, specific shapes that give characteristic echoes to a sound stimulus produced by a smart phone or other device could be used to identify the specific door as discussed above.

From the foregoing, it will be observed that numerous variations and modifications may be effected without departing from the spirit and scope hereof. It is to be understood that no limitation with respect to the specific apparatus illustrated herein is intended or should be inferred. It is, of course, intended to cover by the appended claims all such modifications as fall within the scope of the claims. Further, logic flows depicted in the figures do not require the particular order shown or sequential order to achieve desirable results. Other steps may be provided, or steps may be eliminated from the described flows, and other components may be added to or removed from the described embodiments.

The invention claimed is:

1. A door access system comprising:
    a readable door identifier associated with a selected door, wherein the readable door identifier comprises specific shapes that give characteristic echoes to a sound stimulus from a portable wireless device;
    the portable wireless device that carries a reader for the readable door identifier;
    an access control unit in at least intermittent communication with the portable wireless device; and
    an interface unit in at least intermittent communication with the access control unit and with door accessories associated with a plurality of doors, including a door accessory associated the selected door, for controlling access to respective doors of the plurality of doors,
    wherein the access control unit receives a representation of the readable door identifier from the portable wireless device and responds to the readable door identifier by making an access determination and transmitting a command to the interface unit, and
    wherein the interface unit receives the command from the access control unit, and responds to the command by providing access via the door accessory associated with the selected door.

2. The door access system as in claim 1 wherein the readable door identifier comprises one of an optically readable, magnetically readable, or RF readable code.

3. The door access system as in claim 1 wherein the readable portable wireless device is selected from a class that includes a wireless phone, a PDA, a tablet computer, and a lap top computer.

4. The door access system as in claim 1 wherein the portable wireless device includes an interface for entry of an access code.

5. The door access system as in claim 4 wherein the portable wireless device transmits the access code and the representation of the readable door identifier to the access control unit.

6. The door access system as in claim 1 further comprising circuitry to release a lock of a respective door of the plurality of doors.

7. A door access control system comprising:
    a unique passive identifier associated with a respective door of a plurality of doors for which controlled access is desired, wherein the unique passive identifier is attached to a location on or adjacent to the respective door of the plurality of doors, and wherein the unique passive identifier comprises specific shapes that give characteristic echoes to a sound stimulus from a portable wireless device;
    the portable wireless device, wherein the portable wireless device scans or reads the unique passive identifier of the respective door for which access is desired, and wherein a representation of the unique passive identifier along with an identifier of the portable wireless device are transmitted to an access control unit; and
    a data base of the access control unit that is interrogated to determine whether the identifier of the portable wireless device is authorized to open the respective door;
    wherein, if authorized, then the access control unit transmits an access command to an interface unit that, responsive to the access command, releases a locking mechanism for the respective door, and
    wherein the interface unit communicates with a locking mechanism for each of the plurality of doors, including the locking mechanism for the respective door, for controlling access to each of the plurality of doors.

8. The door access control system as in claim 7 wherein the unique passive identifier comprises a respective optical or magnetic barcode.

9. The door access control system as in claim 8 wherein the interface unit communicates wirelessly with the access control unit.

10. A method comprising:
establishing a readable door entry identifier, wherein the readable door entry identifier comprises specific shapes that give characteristic echoes to a sound stimulus from a portable wireless device;
associating the readable door entry identifier with a selected door;
establishing an interface unit in communication with respective door accessories associated with respective doors of a plurality of doors, including a door accessory associated with the selected door, for controlling access to the respective doors of the plurality of doors;
sensing the readable door entry identifier;
transmitting the readable door entry identifier to a predetermined location;
evaluating the readable door entry identifier at the predetermined location;
determining, at the predetermined location, if the selected door should be unlocked given results of the evaluating; and
given results of the determining, transmitting a command to the interface unit.

11. The method as in claim 10 wherein establishing the readable door entry identifier comprises selecting one of a magnetic or optical bar code and affixing the magnetic or optical bar code near the selected door.

12. The method as in claim 10 wherein sensing the readable door entry identifier includes providing a door entry identifier reader.

13. The method as in claim 12 wherein the door entry identifier reader responds to an optical identifier or a magnetic identifier.

14. The method as in claim 10 wherein authorizing indicia associated with respective wireless devices are pre-stored for use during the evaluating.

15. The method as in claim 14 wherein wireless device identification information along with the readable door entry identifier associated with the selected door are transmitted from the portable wireless device to the predetermined location.

16. The method as in claim 15 wherein the wireless device identification information is compared to the authorizing indicia.

17. The method as in claim 16 wherein, unless a comparison of the wireless device identification information to the authorizing indicia, produces a predetermined result, the selected door will not be unlocked.

18. The method as in claim 14 wherein additional indicia are pre-stored, and wherein each of the additional indicia is associated with authorized access to one or more predetermined doors of the plurality of doors.

19. The method as in claim 10 wherein a database of predetermined identifiers is pre-stored at the predetermined location.

* * * * *